United States Patent [19]
Hazelton et al.

[11] Patent Number: 5,273,797
[45] Date of Patent: * Dec. 28, 1993

[54] FOOD PACKAGE, RETORT LIDDING, AND COEXTRUDED FILM THEREFOR

[75] Inventors: Donald R. Hazelton, Chatham, N.J.; Lawrence K. Locke, Seabrook, Tex.

[73] Assignee: Exxon Chemical Patents Inc., Linden, N.J.

[*] Notice: The portion of the term of this patent subsequent to Sep. 6, 2005 has been disclaimed.

[21] Appl. No.: 464,812

[22] Filed: Jan. 16, 1990

Related U.S. Application Data

[60] Division of Ser. No. 240,890, Sep. 6, 1988, abandoned, which is a continuation-in-part of Ser. No. 1,301, Jan. 8, 1987, Pat. No. 4,769,261.

[51] Int. Cl.$^5$ .................. B32B 27/08; B65D 65/40
[52] U.S. Cl. .................. 428/34.7; 428/34.9; 428/35.2; 428/495; 428/493; 428/494; 428/516; 428/517; 428/523
[58] Field of Search .......... 428/516, 34.9, 35.2, 428/495, 493, 494, 517, 523, 34.7

[56] References Cited

U.S. PATENT DOCUMENTS

| | | | |
|---|---|---|---|
| 4,340,641 | 7/1982 | Weiner | 428/349 |
| 4,769,261 | 9/1988 | Hazelton et al. | 428/35 |
| 4,778,697 | 10/1988 | Genske et al. | 428/349 |
| 4,784,885 | 11/1988 | Carespodi | 428/349 |
| 4,879,177 | 11/1989 | Boice | 428/516 |
| 4,921,749 | 5/1990 | Bossaert et al. | 428/516 |
| 4,929,479 | 5/1990 | Shishido et al. | 428/516 |
| 4,937,139 | 6/1990 | Genske et al. | 428/349 |

Primary Examiner—Alexander S. Thomas
Assistant Examiner—Charles R. Nold
Attorney, Agent, or Firm—Michael E. Wilson; Jaimes Sher

[57] ABSTRACT

A seal layer for use in heat sealed containers, especially retortable polymer containers. A semirigid or rigid packaging container with a multilayer laminate heat sealed to a tray flange, the laminate having a barrier layer and the lidding being easily opened by cohesive failure of a layer containing as elastomer. The elastomer is preferably PIB in a heat seal film layer on a polypropylene tray.

20 Claims, 1 Drawing Sheet

FOOD PACKAGE, RETORT LIDDING, AND COEXTRUDED FILM THEREFOR

CROSS-REFERENCE

This is a division of application Ser. No. 240,890, filed Sep. 6, 1988, now abandoned, which is a continuation-in-part of U.S. Ser. No. 001,301, now U.S. Pat. No. 4,769,261.

BACKGROUND OF THE INVENTION

I. Field of the Invention

This invention relates generally to packaging containers and lidding stock; and in particular to heat sealed barrier multilayer laminates.

This invention relates generally to retort pouches and food packages. In one aspect it relates to a coextruded three layer film for use in retort pouches wherein each layer contains elastomer. In another aspect, the invention relates to a three layer laminate, one of which is a coextruded three ply film, for use in retortable pouches. In still another aspect the invention relates to a method of packaging food for retorting.

II. Description of the Prior Art

There is a trend in the food packaging industry to replace metal cans with plastic containers, notably pouches and trays containing sterilized or pre-cooked foods. Such retort pouches and trays offer many advantages over rigid metal packages: faster cook/sterilizing time, less shelf storage space, easier disposal, improved food taste, etc. The pouches are typically three layer laminates of an outer film (e.g., biax oriented nylon and/or polyester), a middle moisture and oxygen barrier film (e.g., aluminum foil, PVDC, or EVOH), and an inner heat seal layer film (PP, PPRC, or LLDPE or blends thereof). Adhesives to join the three layers together are typically of the polyurethane and/or maleated polyolefin types. (The resin abbreviations used herein are defined in "Description of Preferred Embodiments").

Large No. 10 cans (those containing about 3.2 liters of liquid food) have been slow to convert to flexible retort pouches and rigid or semirigid trays. Large plastic containers used to package foods have been limited to high acid foods (e.g., catsup) which do not require sterilization to kill botulism toxin. In such containers, LLDPE is often selected as the inner heat seal layer film because of its low cost, toughness and drop impact resistance. However, LLDPE cannot be used in large institutional-size retort pouches (volumetric content larger than 1 liter) which require sterilization, because it softens at typical high temperature sterilization or retort temperature (121° C. and higher). Although PP or PRC films can be and are used in smaller size retort pouches (in the order of 0.25 to 1 liter content) because of their higher temperature resistance, they are unacceptable in the larger size pouches because they do not possess adequate toughness or drop impact strength to prevent breakage. With small containers, hydraulic forces resulting from vertical impact are not large. However, with large containers, the hydraulic forces become excessive, particularly on lateral seals. Because of this deficiency there exists a definite market need for institutional size pouches (greater than 1 liter and preferably 2 liter and larger) possessing a tough inner ply heat seal film which is resistant to high temperature retorting temperatures.

Blending elastomer into PP and PPRC is one well established method for improving film toughness and is being practiced commercially. PPRC monolayer film modified with PIB is used as the inner seal layer of medical enteral pouches used to deliver nutritional fluid to hospital patients unable to take food orally. These small 3-layer laminated pouches are typically one liter in size and weight approximately 2.2 lbs. AT least one side of these pouches consists of an all-plastic construction so that the fluid level can be monitored. In order to assure adequate impact toughness, these pouches are subjected to vertical drop tests. Typical vertical drop heights for these products are 4-6 feet. For greater drop height performance, smaller pouches (in the order of 0.5 liters) are sometimes used. However, pouches of this type are far too small for use as institutional food pouches.

European Patent Application 0,165,791 discloses a composite film structure comprising rubber-containing core and polyolefin resin. The skin layers of this composite however, contain no rubber. As demonstrated below, rubber (elastomer) in both the skin and core layers improves performance of the pouch.

There is a need in the food packaging industry for sealed rigid or semirigid polyolefin containers especially a retortable, easy open container with a barrier layer and heat seal lidding stock to make the container shelf stable.

SUMMARY OF THE INVENTION

The invention is an easy open, retortable, semirigid or rigid packaging container comprising:
a) a container tray having a flange for sealing; and
b) a multilayer lidding laminate sealing said container tray about said flange and having:
  (i) a barrier layer;
  (ii) a multilayer film comprising (1) a first polyolefin layer; and (2) a second polyolefin layer;
wherein at least one of said first layer and said second layer contains elastomer and they contain different amounts of elastomer whereby said multilayer film cohesively fails in the area along the interface of said first and second polyolefin layers thereby leaving visible evidence of the seal on said flange.

The invention is also a process for preparing an easy open food package comprising the steps of:
a) filling a flanged plastic tray with a food product;
b) providing a multilayer lidding stock over the filled tray; and
c) heat sealing said lidding stock entirely about the flange of said tray so as to enclose said food package and so as to leave loose edge or tab of said lidding stock for opening said food package,
wherein said lidding stock comprises a barrier layer laminated or coextruded to a heat seal film comprising first and second polyolefin layers wherein at least one of said first layer and said second layer contains elastomer and they contain different amounts of elastomer whereby said multilayer film cohesively fails in the area along the interface of said first and second polyolefin layers thereby leaving visible evidence of the seal on said flange.

IT has been discovered that by utilizing a special coextruded inner heat seal layer in a retortable pouch, the problem of room temperature impact strength of large containers is effectively overcome. Although retortable pouches are available in a variety of sizes and constructions, those used in food packaging almost all include a barrier layer and an inner seal layer. The inner seal layer of the retortable pouch of the present invention comprises a coextruded multilayer film which may be an AB, ABA or an ABC structure, where A is the inner skin layer, C the outer layer, and the B the core layer. As used herein, the inner layer A is the layer of the package in contact with the food and the outer layer C is adjacent to the barrier layer (with or without adhesives).

The A and B layers comprise a blend of an elastomer and a polyolefin, preferably PP, more preferably PPRC. Outer skin layer C may be any polyolefin suitable for interfacing with the barrier resin/foil, but preferably has the same composition as A, making the seal layer an ABA structure. Layers A and B each include sufficient elastomer to increase impact strength to the final structure. However, skin layer A contains substantially less elastomer than core layer B. the amount of elastomer in the total film should be in excess of 50 wt% but not more than 70 wt% and preferably not more than 60 wt%. The amount of elastomer in skin layer(s) A should be sufficiently small to avoid or minimize blocking or sticking on the film roll but sufficiently large to add to the impact strength of the 3 layer structure. ABA/ABC thickness ratios may vary within wide limits but preferably range from about 3:94:3 to 20:60:20.

The present invention also includes a pouch structure per se, comprising an outer structural layer; a barrier layer and the three ply inner seal layer of the structure described above. The three ply ABA or ABC structures are useful in retortable pouches which exhibit exceptionally high impact strength and are particularly suitable for use in large institutional-sized retortable flexible containers (larger than 1 liter e.g., 1.25 liters and preferably between 1.5 and 4.0 liters and most preferably between 1.8 and 3.5 liters large).

DESCRIPTION OF THE PREFERRED EMBODIMENTS

In its broadest embodiment, the invention comprises a multilayer film which is particularly useful in retort pouches and lidding stock. In many institutions such as hospitals, military, and schools, large retort pouches and sealed plastic food packages (trays) have potential application. A retort pouch and sealed tray must possess the following properties, all of which are provided or affected by the inner seal layers:

1. they must be heat sealable for closing the container securely following filling;
2. they must be flexible and yet have sufficient toughness and impact strength to enable the container to withstand severe abuse testing in accordance with industry shipping standards.
3. they must be capable of withstanding sterilization at temperatures in the range of 121° C.-135l° C. to kill botulism;
4. they must possess non-blocking properties in that the interior opposed faces of the container must not stick together which would impede filling a pouch or sealing a plastic tray;
5. the film used in the pouches must be processable without sticking as it is unrolled from the film roll during manufacture of pouches or lidding stock and subsequent sterilization;
6. they must have sufficient capacity to be economical, (institutions serving large numbers of people are not likely to use extensively containers having capacities less than one liter).

Figure 1:
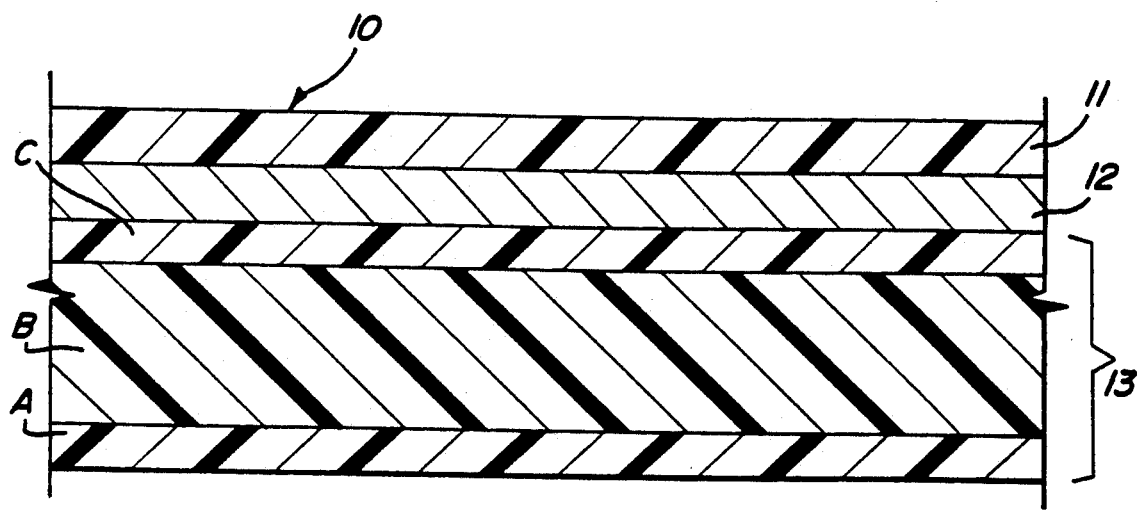
FIG. 1 is a cross section view of a laminated film constructed according to the present invention.

Although retortable pouches, one panel of which is represented as in FIG. 1, are available in various constructions, they generally include the following layers: an outer structural layer 11, a barrier layer 12, and a seal layer 13 laminated together with suitable adhesive tie layers. The lidding stock multilayer films generally contain first and second polyolefin layers with one or both of the layers containing elastomer and the two layers containing different amounts of elastomer. The layers are described separately below.

Structural Layer: The structural layer 11 provides structural strength, abrasive resistance and a printable surface for the container lidding or pouch. It normally is composed of a thermoplastic such as polyolefins, polypropylene [e.g., propylene homo polymers (PP) and copolymers], polyester, nylon, and the like. Biaxially oriented nylon and biaxially oriented polyester are the preferred structural layers. Although not essential to the pouch or container, the structural layer is preferred since as noted above it adds strength, durability, and printability to the pouch or container.

Barrier Layer: The barrier layer 12 is substantially impermeable to oxygen for protecting the food medium contained in the pouch or food package. Barrier layer materials include aluminum foil, thermoplastic films such as ethylene vinyl alcohol (EVOH), polyvinyldienedichloride (PVDC), polyvinyl alcohol (PVA), and the like. Aluminum foil is the preferred barrier layer. In packaging where oxygen barrier requirements are not stringent, biaxially oriented nylon or polyester are sometimes employed. The compositions and methods of manufacture of barrier layers and structural layers are well known to the industry and are described in the published literature.

Seal Layer: The main function of the seal layer 13 is to provide a substance which is heat sealable (fusible) with itself to seal the pouch or to the flange of a plastic tray.

An important aspect of the present invention is the composition of the seal layer which enables the pouch or lidding stock to satisfy the requirements mentioned above. The present invention contemplates the use of a coextruded film as the seal layer, comprising an ABA composite or an ABC composite wherein A is the inner layer of the film, B is a core layer, and C is the outer layer of the film.

The inner layer (A) (and preferably the outer layer (C)) and the core layer (B) each comprises two essential ingredients: a polyolefin and an olefinic elastomer which are blended in different ratios. The core layer is elastomer rich—more than 50 wt% elastomer—and the inner layer (and preferably the outer layer) is elastomer lean—less than 50 wt% elastomer.

The polyolefin resins which are suitable for use in the practice of this invention for blending with the elastomer are those which have a semi-crystalline or crystalline melting point or at least 110° C. Illustrative, non-limiting examples of the polyolefins suitable for use in the practice of this invention are polypropylene (PP), linear low density polyethylene (LLDPE) (e.g., a copolymer of ethylene and 3-15% of an olefin having 4 to 12 carbon atoms) and polybutylene (PB). As used in the specification and claims, the term "polypropylene" includes homopolymers of propylene as well as reactor copolymers of propylene (PPRC) which include both random copolymers and impact copolymers. Random copolymers contain about 1 to about 6 wt% ethylene or an alpha olefin monomer of 4 to 16 carbon atoms, and impact copolymers contain from 6 to 20 wt% ethylene or alpha olefin comonomer of 4 to 16 carbon atoms. The polypropylene can be highly crystalline isotactic or syndiotactic polypropylene. The density of the PP or PPRC ranges from about 0.89 to about 0.91g/cc and the MFR is typically in the range of 0.5 to 5.0. Blends of these polyolefin resins may be used. For example, LLDPE may be blended into PP, not at a high enough concentration to harm thermal stability, butyl at a concentration to favorably affect heat sealability. The propylene content of the inner layer A should be at least 20 wt%.

As demonstrated by the experiments described below, PPRC (specifically random copolymer) gave the best results in improvements in the impact strength and accordingly is preferred for blending with the elastomer resins.

The rubbers (elastomeric resins) which can be used in the practice of this invention include both synthetic and natural rubbers; preferably the rubbers have a glass transition temperature (Tg) of less than b 0° C. Illustrative, non-limiting examples of rubbers suitable for use in the practice of this invention include polyisobutylene (PIB), butyl rubber, halogenated butyl rubber, ethylene propylene rubber (EPM), ethylene-propylenediene rubber (EPDM), polyisoprene, polychloroprene, styrenebutadiene rubber, polybutene copolymers, nitrile rubbers, chlorosulfonated polyethylene, etc. While polyisobutylene (PIB) is not a pure rubber because it cannot be vulcanized, it can be utilized in the practice of this invention provided that the PIB has a viscosity average molecular weight (Flory) of about 900,000 to about 1.6 million.

The term "rubber" as used in the specification and claims means any natural or synthetic polymer which can be vulcanized or cured so as to exhibit elastomeric properties. For the purpose of this invention, PIB is considered a rubber although it cannot be vulcanized.

The terms EPM and EPDM are used in the sense of their ASTM designations (ASTMD-1418-72a). EPM is an ethylene-propylene copolymer which can be cross-linked by radiation curing or peroxide curing.

As used in the specification and claims the term "EPDM" means terpolymers of ethylene and alphaolefin and non-conjugated diene. The non-conjugated diolefin can be straight cain, branched chain or cyclic hydrocarbon di-olefins having about 5 to about 15 carbons atoms such as:

a) straight chain dienes such as 1,4-hexadiene and 1,6-octadiene;
b) branched chain acyclic dienes such as 5-methyl-1,4-hexadiene; 3,7-dimethyll-1,6-octadiene; 3,7-dimethyll-1,7-octadiene and the mixed isomers of dihydromyricene and dihydro-ocinene;
c) single ring alicyclic dienes such as 1,3-cyclopentadiene; 1,4-cyclohexadiene; 1,5-cyclo-octadiene and 1,5-cyclododecadiene;
d) multi-ring alicyclic fused and bridged ring dienes such as tetrahydroindene, methyl, dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-norbornene and norbornadiene.

Of the non-conjugated dienes typically used to prepare EPDM terpolymers the preferred dienes are dicyclopentadiene, 1,4-hexadiene, 5-methyl-2-norbornene and 5-ethylidene-2-norbornene. Particularly preferred diolefins are 5-ethylidene-2-norbornene. (ENB) and 1,4-hexadiene.

EPDM elastomers and their general method of manufacture are well known in the art. The preferred EPDM elastomers contain about 20 to about 90 wt% ethylene, more preferably about 30 to 80 wt% ethylene, most preferably about 35 to about 75 wt% ethylene.

The alpha-olefins suitable for use in the preparation of EPDM are preferably $C_3$-$C_{16}$ alpha olefins. Illustrative non-limiting examples of such alpha olefins are propylene, 1-butene, 1-pentene, 1-hexane, 1-octene and 1-dodecene. The alpha olefin is generally incorporated into the EPDM polymer at about 10 to about 80 wt%, more preferably at about 20 to about 70 wt%. The non-conjugated diene is incorporated into the EPDM at about 0.5 to about 15 wt%; more preferably about 1 to about 5 wt%, e.g., 3wt%.

The term "nitrile rubber" means an acrylonitrile copolymer rubber. Suitable nitrile rubbers comprise rubbery polymers of 1,3-butadiene and about 20-50 wt% acrylonitrile. Any nitrile rubber which is a "solid" rubber having an average molecular weight of at least 50,000 and preferably between about 100,000-1,000,000 can be used. Commercially available nitrile rubbers suitable for the practice of the invention are described in *Rubber World Blue Book*, 1980 Edition, Materials and Compounding Ingredients for Rubber," pages 386-406, which is incorporated herein by reference.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85-99.5wt% (preferably 95-99.5wt%) of a $C_4$-$C_7$ about 5-0.5 wt%) of a multiolefin of about 4-14 carbon atoms. These copolymers are referred to in the patents and literature as "butyl rubber"; see, for example, the textbook *Synthetic Rubber* by G.S. Whitby (1954 edition by John Wiley and Sons, Inc.), pages 508-609, etc. which is incorporated herein by reference. The term "butyl rubber" as used in the specification and claims includes the aforementioned copolymers of an isoolefin having 4-7 carbon atoms and about 0.5 to 20 wt% of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about $-90°$ C. to $-100°$ C. See U.S. Pat. Nos. 2,356,128 and 2,356,129 incorporated herein by reference.

In the halogenation process, butryl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference. p
The rubbers used in the practice of this invention are preferably utilized in their unvulcanized state. The preferred rubber is PIB.

The core layer (B) and skin Layers (A and C) of film composite 13 preferably have the following construction:

|  | Composition (wt %) | | Thickness |
| --- | --- | --- | --- |
|  | Elastomer | Polyolefin | (% of Total) |
| Outer Layer (C) | 0–40 | 60–100 | 3–20 |
| Core Layer (B) | >50–75 | 25–<50 | 60–94 |
| Inner Layer (A) | 10–40 | 60–90 | 3–20 |
| Total Composite | >50–70 | <30–50 | 2–10 mils |
| Preferred Construction | | | |
| Outer Layer (C) | 15–30 | 70–85 | 7–15 |
| Core Layer (B) | >55–70 | 30–45 | 70–86 |
| Inner Layer (A) | 15–30 | 70–85 | 7–15 |
| Total Composite | >50–60 | 40–<50 | 4–7 mils |

As indicated above the total elastomer content of the composite seal layer 13 comprises more than 50% in order to impact the necessary impact strength to the pouch. The polyolefin, particularly PPRC, provides for shrinkage stability of the film and retortability without sacrificing impact strength. The elastomer in the inner layer A contributes to impact strength and heat seal strength; excessive elastomer therein is undesirable since it results in roll sticking and/or container blocking. The gradient approach (i.e., rubber lean skin and rubber rich core) yields the highest total rubber content without film blocking.

For food packages, it is be preferred to use two different blend layers since this leads to easy opening containers. The cohesive failure is achieved at a lower, but seal safe, level of opening force. The two layers contain different proportions of elastomer and PIB is preferred.

The compositions of this invention may also include rubber extender oils as well as processing aids and stabilizer, fillers and the like.

Food pouches and containers (trays) are generally steam autoclaved at about 121° C. in order to sterilize the food. The pouches and containers prepared with the use of composite film as the seal layer 13 according to this invention must not only withstand the autoclave conditions, they must also exhibit a low water loss both during autoclaving and in storage. Rubbers based on isobutylene, e.g., PIB and butyl rubber, have the lowest water vapor transmission rate among rubbers, and also are broadly FDA regulated. Hence they are the preferred rubbers for use in this invention.

Preparation of composition for each layer usable in this invention can be achieved in several different ways. The components may be brought into intimate contact by, for example, dry blending these materials and then passing the overall composition through a compounding extruder. Alternatively, the components may be fed directly to a mixing device such as a compounding extruder, high shear continuous mixer, two roll mill or an internal mixer such as a Banbury mixer. The optional ingredients previously described can be added to the composition during this mixing operation. It is also possible to achieve melt mixing in an extruder section of a coextrusion apparatus. Overall, the objective is to obtain a uniform dispersion of all ingredients and this is readily achieved by inducing sufficient shear and heat to cause the plastic components(s) to melt. However, time and temperature of mixing should be controlled as is normally done by one skilled in the art so as to avoid molecular weight degradation.

Although ABC structures may be employed for fabrication by coextrusion, as mentioned previously, it is preferred to use an ABA film. This film may be coextruded by using conventional extruding and casting equipment wherein one extruder casts the core layer (B) and another extruder casts the skin layers (A). Chill rolls and silicon rolls also may be employed in the casting process. The three layer coex film may be prepared and stored as a roll for fabrication into the pouch film in subsequent operations.

RETORT POUCH

As mentioned previously, the composite film forms the inner seal layer of a retort pouch 10A having the following structure:

|  | COMPOSITION | THICKNESS | | | |
| --- | --- | --- | --- | --- | --- |
|  |  | | Broad Range | | Preferred Range |
|  |  | mils | % of Total | mils | % of Total |
| Structural Layer | thermoplastic |  | 0–25 |  | 5–20 |
| Barrier Layer | barrier resin/foil |  | 3–15 |  | 4–10 |
| Seal Layer | composite film | 2–10 | 60–97 | 4–7 | 70–90 |

Figure 2:
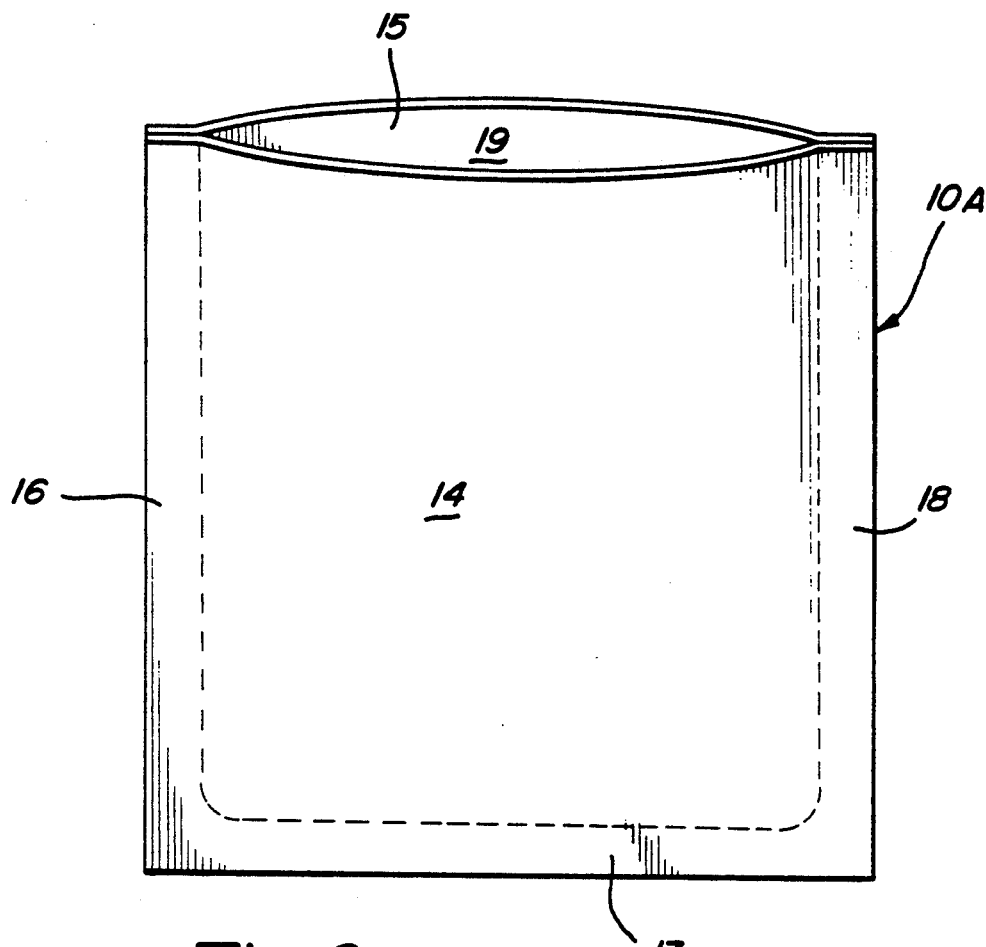
FIG. 2 is a pouch made from the film of FIG. 1.

As shown in FIG. 2, the pouch 10A preferably is made by laminating the three layers 11, 12, and 13 forming a roll stock having the cross section of FIG. 1. The roll stock then is used to form two panels 14 and 15, cutting the panels to the proper size, and heat sealing three of the four sides of the aligned edges 16, 17 and 18 of the panels, leaving one side 19 open to permit filling with food or other perishable goods.

The three layers may be laminated together using conventional equipment and techniques.

Suitable adhesives, or tie layers, may be used to adhere the component layers together. For example, adhesives such as heat curable polyurethane are useful at the interface of nylon layer 11 and aluminum foil layer 12 and at the interface of aluminum layer 12 and the seal layer 13. Likewise, maleic-grafted polyolefins may be used at the interface of nylon layer 11 and PVDC or EVOH layer 12, and at the interface of the ABA (or ABC) seal layer 13 of the present invention. Other tie resins are well known in the art.

The laminated roll stock is processed into pouches using conventional equipment and techniques. The form, fill and seal (F/F/S) machinery process is one such technique. In this process, two superimposed layers of the laminated film of the desired width with interfacing seal layers are fed into the packaging machine. Bar seals fuse three sides of the square or rectangular pouch and a jaw separates the pouch with one open end. Food is then introduced into the pouch through the open end. Finally, the machine heat seals the open end producing a fully closed pouch.

For large institutional contains, the panels for pouches will be sufficiently large to provide the pouch with a capacity ranging from greater than 1 (e.g., about 1.2 liters) to 5 liters, preferably between 1.5 to 4.0 liters, and more preferably between 1.8 and 3.5 liters. These pouches are adapted to be filled with a liquid or semiliquid food (e.g., low acid particulates such as stew). Packaging machines which fill by the F/F/S process include Prodo Pak's Model HFF-1000 and N & W Packaging System Model MAX 2014. Preformed pouches may also be employed in this operation, pouches with an open end are prepared and subsequently filled with the liquid or semiliquid substance in a separate step.

The packaged food is then sterilized at temperatures of 121° C. to 135° C. for 3 to 6 minutes depending on the type of food and food processing techniques.

RETORT FOOD PACKAGES

Two six-inch oval opening polypropylene food trays having a ¼-inch flange plus an extended portion of the flange at each end of the oval. The trays were heat sealed with a lidding stock under 25 PSI pressure at 385° F. for 1.25 seconds to form a single (multiple seals could be used) ⅛-inch seal entirely around said flange. The lidding stock was cut to about the shape of the flange leaving tab ends over the extended portions of the tray flange.

The sealed tray was retorted at 121° C. as described above. After cooling, the package remained sealed with both tray and lidding stock intact. The food package was easily opened with about 5-10 pounds pull on the tab end of the lidding stock back across the tray.

Two 2-inch round polypropylene tubs were sealed as above but at 8 psi and 365° F. and 1.75 seconds to impart a 1/16-inch seal around the tubs. A tab end of the lidding stock was left to project outside the circular tubs for easy opening. Again the lidding was easily removed. The lidding stock may be heat sealed to the flange at about 5-50 psi and about 300°-400° F. for about 1-2 seconds.

For all four tubs the heat seal film inner layer contained about 24 weight percent PIB and the balance PPRC. The second or core layer of the film contained 65 weight percent PIB and the balance PPRC. For all four tubs the inner and or core layer cohesively failed (was torn apart within the layer(s)) but the entire lidding stock did not peel off and the laminated layers of the lidding stock did not delaminate. The barrier layers were laminated aluminum foil then laminated PET. Furthermore, the cohesively failed elastomer-containing layer left a visible seal line entirely around the full circumference of the tray flanges.

For elastomer-containing seal layers of pouches opened by pulling apart opposite walls of the pouch, the cohesive failure of the layer(s) has been verified by electron microphotographs.

One of the problem associated with institutional-sized plastic containers for packaging liquid or semi-liquid food is their inability to withstand impact forces following heat sterilization. The heat weakens the seals and the hydraulic forces on dropping creates high stresses in the horizontal direction. Thus, an essential property of each pouch or container is that it is capable of withstanding impacts during handling and transport. The industry has developed a number of tests for determining the suitability of the pouches and containers for shipping in cases; two of which are ASTM and NSTA standards described below. In addition, it has been found that drop tests on individual pouches provides a reliable test for determining (qualitatively) the impact strength of pouches. These tests involve multiple drops of each pouch before retorting. The term "multiple drop tests" means that the pouch is dropped on each of the four sealed edges and on one flat surface from an elevation of 10 feet onto a flat metal surface.

EXPERIMENTS

Effects of Rubber on Heat Sealability of PP:

Tests were carried out on the heat seal strength of monolayer film of various blends of PP and EPDM (Vistalon ©3708 marketed by Exxon Chemical Company). These tests indicated that the addition of the elastomer up to about 40 wt% improves heat seal strength for elastomer/PP blend film. Elastomer content above 40% in the film showed little or no improvement in heat seal strength. Retorting a blend of 40% elastomer and 60% PP at 121° C. for 30 minutes reduced seal strength by only 19%; the remaining seal strength was adequate for packaging purposes.

Pouch Tests

Pouches (12 inch ×12 inch and 10 inch ×13 inch) were made using a 4-mil or 7-mil seal layers having the following compositions:

TABLE 1

| | SEAL LAYER FILM X | | |
|---|---|---|---|
| Layer | Composition | wt % | Thickness (% of Total) |
| A | VISTANEX L-100[1]/PPRC[2] | 24/76 | 10 |
| B | VISTANEX L-100[1]/PPRC[2] | 65/35 | 80 |
| C | VISTANEX 1-100[1]/PPRC[2] | 24/76 | 10 |

[1] PIB, EXXON Chemical Co.
[2] 3 wt % ethylene, MFR

The seal film was laminated with structural and barrier layers to form two roll stocks which were used to fabricate pouches having the compositions of Pouches 1 and 2 described in Table 2. The Pouch 2 structures made from one of the roll stocks were 12"×12" and were fabricated, filled, and sealed using Prodo Pak's Model HFF1000 Fillersealer. The seal temperatures were about 410° F. with a horizontal dwell of 4 seconds and a vertical dwell of three-fourths second and a line speed of 12 pouches per minute. Seal pressures were 80 psi for horizontal seals and 70 psi for vertical seals. Pouch structures made from the other roll stock were 10"×13" and were made using preformed equipment at approximately the same process conditions.

TABLE 2

| | LAMINATED POUCHES | |
|---|---|---|
| | Pouch 1 | Pouch 2 |
| Structural Layer: | PET/T$_3$ | BN/T$_3$ |
| Barrier Layer: | Al/T$_4$ | Al/T$_4$ |
| Seal Layer: | Seal Layer X | Seal Layer X |

BN - Biax nylon (60 gauge)
Al - Aluminum Foil (35 gauge)
T$_3$ - Tie layer marketed by Morton Chemical as Adcote 550.
T$_4$ - Tie layer marketed by Morton Chemical as Adcote 506-40/9L10.
PET - Biaxially oriented polyester manufactured by DuPont (48 gauge).

The pouches were filled with 1.9 liters or 3.18 liters of liquid, and drop tested by the multiple drop test method before retorting. The following summarizes the test results:

TABLE 3

MULTIPLE DROP TESTS

|  | Pouch 1 (1.9 Liters) | Pouch 2 (3.18 Liter) |
|---|---|---|
| No. Samples Tested (Thickness of Seal Layer) | 50 (4 mil) | 75 (4 mil) 50 (7 mil) |
| Results | Passed multiple drop test | Passed multiple drop test |

The above tests demonstrate that (a) the retorted pouches made in accordance with the present invention exhibit improved impact strength and (b) the improved results are due to the composition of the seal layer.

In order to assure safe handling of the pouches packed in shipping containers during transit, the pouches (after filling and retorting) should pass tests established by the ASTM and/or the NSTA. Such tests include Vibration Testing for Shipping Containers (ASTM D999-75) and Drop Testing for Shipping Containers (ASTM D775-61), and NSTA Test Procedures, Project IA. The pouches of the present invention packed in shipping containers (2 stacks, 3 high) are capable of passing the ASTM test and the more stringent NSTA tests. This capability of the institution-sized packages, particularly those between 1.8 and 3.5 liters has not been achieved with prior art pouches.

The following Container Drop Tests on pouches 1 and 2 demonstrate this capability and exemplify the high impact strength of the pouches.

Pouches had the structures and compositions of pouches 1 and 2 described in Table 2 and were retorted for about 16 minutes at about 121° C. Corrugated cardboard cases were packed with six of each type of pouch after retorting. Each case was provided with two vertical compartments which snugly contained three stacked pouches. Each case was tested by the ASTM or NSTA Drop Tests described above (including vibration tests prior to dropping). TABLE 4 summarizes the container Drop Tests.

TABLE 4

CONTAINER DROP TESTS

| Pouch Type | Seal Layer Thickness Mils | size inches | Liquid Contents liters | No. Containers Tested | Test Method | Test Results |
|---|---|---|---|---|---|---|
| 1 | 4 | 10 × 13 | about 1.9 | 20 | ASTM D775-61 (12") | Passed |
| 2 | 4 | 12 × 12 | about 3.18 | 10 | ASTM D775-61 (12") and NSTA | Passed |
| 2 | 7 | 12 × 12 | about 3.18 | 10 | ASTM D775-61 and NSTA | Passed |
| 1 | 7 | 10 × 13 | about 1.9 | 5 | ASTM D775-61 (12") | Passed |

As indicated above the Multiple Drop Tests are carried out before retorting and the Container Drop Tests are carried out after retorting. Tests have shown that pouches that pass the Multiple Drop Tests also pass the ASTM and NSTA Container Drop Tests. The Multiple Drop Test thus provides a reliable, simple and inexpensive test for determining the quality of shipping pouches.

Blocking Tests

Tests using a roll of monolayer seal layer film containing 65 wt% VISTANEX and 35 wt% PPRC exhibited severe blocking, demonstrating the problem associated with high rubber content. The roll stock used in preparing Pouches 1 and 2, however, exhibited little or no blocking.

We claim:

1. A multilayer heat seal film having at least two layers for use in a multilayer laminate lidding stock comprising:
   a first skin layer comprised of a majority of polyolefin and a minority of elastomer; and
   a second, core layer comprised of a majority of elastomer and a minority of polyolefin,
   said polyolefin characterized as having a semi-crystalline or crystalline melting point of at least 110° C., and the elastomer present in said skin layer being selected from the group consisting of polyisobutylene, butyl rubber, halogenated butyl rubber, ethylene-propylene rubber, ethylene-propylenediene rubber, polyisoprene polychloroprene, styrene-butadiene rubber, polybutene copolymers, nitrile rubber and chlorosulfonated polyethylene.

2. The multilayer film of claim 1 wherein said core layer comprises 55-70 weight percent of said elastomer.

3. The multilayer film of claim 1 further comprising a third, outer layer, said skin layer and said outer layer on opposite sides of said core layer and identical in composition.

4. The multilayer film of claim 1 wherein said polyolefin present in said skin layer is polypropylene.

5. The multilayer film of claim 4 wherein said elastomer is polyisobutylene.

6. The multilayer film of claim 4 wherein said elastomer is ethylene-propylenediene rubber.

7. A multilayer heat seal film having at least two layers for use in a multilayer laminate lidding stock, said multilayer heat seal film comprising:
   a skin layer comprised of a majority of polyolefin and of a minority of elastomer, and
   a core layer comprised of a majority of elastomer and of a minority of polyolefin,
   wherein said elastomer in said skin layer and said core layer is polyisobutylene.

8. The multilayer heat seal film of claim 7 wherein said polyolefin in said skin layer is a blend of polyolefins.

9. The multilayer heat seal film of claim 7 wherein said polyolefin in said core layer is a reactor copolymer of propylene.

10. The multilayer heat seal film of claim 7 wherein said polyolefin has a semi-crystalline or crystalline melting point of at least 110° C.

11. The multilayer heat seal film of claim 7 wherein said elastomer has a glass transition temperature (Tg) of less tan 0° C.

12. A lidding stock comprising an outer layer laminated to a barrier layer, said barrier layer laminated to a multilayer heat seal film, said multilayer heat seal film comprising, in combination:

a skin layer comprised of a majority of polyolefin and of a minority of elastomer, and a core layer comprised of a majority of elastomer and of a minority of polyolefin, wherein said elastomer in said skin layer and said core layer is polyisobutylene.

13. The multilayer heat seal film of claim 12 wherein said polyolefin in said skin layer is a blend of polyolefins.

14. The multilayer heat seal film of claim 12 wherein said polyolefin in said core layer is a reactor copolymer of propylene.

15. The multilayer heat seal film of claim 12 wherein said polyolefin has a semi-crystalline or crystalline melting point of at least 110° C.

16. The multilayer heat seal film of claim 12 wherein said elastomer has a glass transition temperature (Tg) of less than 0° C.

17. A multilayer heat seal film having at least two layers for use in a multilayer laminate lidding stock comprising:

a first skin layer comprised of a majority of polyolefin and a minority of elastomer; and a second, core layer comprised of a majority of elastomer and of a minority of polyolefin, said polyolefin characterized as having a semi-crystalline or crystalline melting point of at least 110° C. and the polyolefin present in said skin layer being selected from the group consisting of polypropylene, copolymers of ethylene and 3-15% of an olefin having 4 to 12 carbon atoms, polybutylene, and mixtures thereof and the elastomer present in said skin layer being selected from the group consisting of polyisobutylene, butyl rubber, halogenated butyl rubber, ethylene-propylene rubber, ethylene-propylenediene rubber, polyisoprene polychloroprene, styrene-butadiene rubber, polybutene copolymers, nitrile rubber and chlorosulfonated polyethylene.

18. The multilayer film of claim 17 wherein said polyolefin present in said skin layer is polypropylene.

19. A multilayer heat seal film having at least two layers for use in a multilayer laminate lidding stock comprising:

a first skin layer comprised of a majority of polyolefin and a minority of elastomer; and a second, core layer comprised of a majority of elastomer and of a minority of polyolefin, wherein said elastomer in said skin layer and said core layer is polyisobutylene and wherein said polyolefin in said skin layer is a blend of polyolefins and said polyolefin in said core layer is a reactor copolymer of propylene.

20. A multilayer heat seal film having at least two layers for use in a multilayer laminate lidding stock comprising;

a first skin layer comprised of a majority of polyolefin and a minority of elastomer; and a second, core layer comprised of a majority of elastomer and of a minority of polyolefin, said polyolefin characterized as having a semi-crystalline or crystalline melting point of at least 110° C. and said elastomer characterized as having a glass transition temperature (Tg) of less than 0° C.

* * * * *